United States Patent [19]

Weinstock

[11] Patent Number: 5,718,457
[45] Date of Patent: Feb. 17, 1998

[54] METHOD OF MARKING OBJECTS WITH CODE SYMBOLS

[75] Inventor: Julian Weinstock, Cambridge, Mass.

[73] Assignee: Elpatronic AG, Zug, Switzerland

[21] Appl. No.: 480,247

[22] Filed: Jun. 7, 1995

[30] Foreign Application Priority Data

Jul. 29, 1994 [CH] Switzerland .......... 02 401/94

[51] Int. Cl.⁶ .................................. G06K 11/00
[52] U.S. Cl. .................................. 283/70; 283/93
[58] Field of Search ............... 235/494; 283/70, 283/93, 114, 117

[56] References Cited

U.S. PATENT DOCUMENTS

| | | | |
|---|---|---|---|
| 3,399,473 | 9/1968 | Jaffe | 283/99 X |
| 3,977,007 | 8/1976 | Berry et al. | 283/93 |
| 4,039,066 | 8/1977 | Quigley | 283/93 X |
| 4,148,507 | 4/1979 | Fisher | 283/34 |
| 4,745,269 | 5/1988 | Van Gils | 235/487 |
| 4,797,945 | 1/1989 | Suzuki et al. | 382/56 |
| 4,990,792 | 2/1991 | Frei | 250/566 |
| 5,153,418 | 10/1992 | Batterman et al. | 283/93 X |
| 5,189,292 | 2/1993 | Batterman et al. | 283/93 X |
| 5,221,833 | 6/1993 | Hecht | 235/494 |
| 5,245,165 | 9/1993 | Zhang | 235/494 X |
| 5,301,238 | 4/1994 | Apter et al. | 381/1 |
| 5,313,108 | 5/1994 | Gross | 250/223 B |
| 5,447,335 | 9/1995 | Haslop | 283/91 |
| 5,473,152 | 12/1995 | Apter et al. | 235/494 |
| 5,507,527 | 4/1996 | Tomioka et al. | 283/93 |

FOREIGN PATENT DOCUMENTS

| | | |
|---|---|---|
| 76592/74 | 6/1976 | Australia . |
| A 0 354 362 | 2/1990 | European Pat. Off. . |
| A 0 469 868 | 2/1992 | European Pat. Off. . |
| A 0 549 315 | 6/1993 | European Pat. Off. . |
| 29 43 811 | 5/1980 | Germany . |
| 30 32 520 | 4/1982 | Germany . |
| 36 26 775 | 9/1987 | Germany . |
| 36 23 475 | 1/1988 | Germany . |
| 39 14 440 | 11/1989 | Germany . |

*Primary Examiner*—Frances Han
*Attorney, Agent, or Firm*—McCormick, Paulding & Huber

[57] ABSTRACT

Optical machine readable code symbols for marking objects, preferably recyclable plastic bottles, are so constructed that they possess an axis of symmetry. The code symbols can additionally be rotated by predetermined angles from a basic configuration in order to be able to represent a plurality of information pieces. The symmetric code symbols are easily recognized and evaluated under difficult conditions such as exist, for example, in a bottle filling operation.

6 Claims, 1 Drawing Sheet

METHOD OF MARKING OBJECTS WITH CODE SYMBOLS

BACKGROUND OF THE INVENTION

The invention relates to a method for marking objects, in particular refillable containers, with code-symbols. Further, the invention relates to a machine readable optical code as well as a code symbol for one such code.

From DE-PS 36 26 775 it is basically known that recyclable containers can be provided on each return trip with a supplemental coding. The coding is produced moreover only by means of radially extending bars. For the problem of making the coding detectable as much as possible without error and arranged in a space-saving manner no solution was provided. The latter is particularly important because the quantity of information which should be detected on the container during the life of the container as information concerning the container itself and the contents is on the increase, and because on the other hand smaller and smaller containers (for example, 0.3 liter PET-Bottles) of this type should be identifiable.

From the EP-A-354,362 Patent it is known that PET-Bottles can be provided with code marking by means of a laser, and from the DE-OS 29 43 811 a special code reading process is known likewise for bar-shaped code marking.

German patent DE-OS 30 32 520 describes an arrangement for the control of the charge period of cylindrical containers, in particular kegs by means of code marking in the form of dashes.

From German patent DE-OS 36 23 475 a method is known for recognizing essentially rotationally symmetric objects, in particular containers, which are provided with code markings. This serves the purpose in the beverage industry, for example, of recognizing a transport container provided with an individual marking from which can be seen, among other things, the properties and the time of the processing in order to be able to pursue or determine the path of the empties. However, this known process relates to little of the code construction, but more to the elimination of the problem of being able to read the coding more accurately, if it does not have an exact predetermined position with respect to an optical sensor. With the known process the code marking is placed as radially extending bars disposed circularly about a center point with different degrees of remission from the circumference.

In the beverage industry, more and more refillable plastic bottles, in particular PET bottles, are being introduced instead of glass bottles. With the plastic bottles the number of refill cycles is limited and with each of these, depending upon the type of fill product, particular refill product sequences are restricted. Such refillable plastic bottles must therefore be separated out when the number of circulations reaches the upper limit. That requires on the one hand that for each refill cycle, that is for each refill, the plastic bottle must at least be provided with one new code symbol in order that the number of refill cycles can be determined from the total number of code symbols. Additionally for the mentioned reason a code should be applied which indicates the type of filling product with which the bottle has already been filled.

One code symbol is known from DE-OS 39 14 440. This patent describes an optically readable binary code as well as a method for its formation and determining its magnitude and density. The code is formed by a checkerboard pattern symbol that yields the information in the form of black and white squares. The binary code is dynamically variable in magnitude, format and in the density of its information. The matrix has a perimeter in which the data is confined. The perimeter is provided with a density indicator for indicating the density of the data in the matrix. Through the use of a density indicator and a magnitude indicator a detection device can calculate the magnitude and the density of the information of the binary code. This known binary code is not adequate for refillable containers like, for example, plastic bottles, because neither a checkerboard matrix of black and white squares nor a sufficient number of such binary codes which have a sufficient magnitude can be placed on the bottles in order that the squares adequately guarantee detection.

One object of the invention is to provide a method by which objects, in particular containers with machine readable codes, can be marked. Accordingly, small code symbols should be capable of being generated so that a sufficiently deep engraving is produced with a commercial laser in a short period of time to guarantee the readability under harsh conditions (for example: humidity in a bottle filling plant). The small code symbols should be readable with a high degree of recognition.

SUMMARY OF THE INVENTION

This object is achieved by a method of the foregoing type in which an arrangement of code symbols is applied to the container. Each individual symbol is comprised of a plurality of surfaces or bar-shaped segments, and has an axis of symmetry.

The symmetric code symbols composed of surfaces contain a redundancy thanks to the symmetry. It has been shown that by this means in the industrial field (high reading speeds based on high bottle processing rates, critical optical recognizability as a result of humid surroundings with water in the form of droplets and films on the bottles) the recognizability can be substantially improved, and that the false confirmation of these symbols during reading/recognition as a result of coincidental (apparently) speeds can be substantially reduced in the recognition and signal path.

Preferably the method is accomplished so that the code is formed of symbols in a base position and symbols in a position rotated therefrom. This allows then the multiple pieces of information to be coded with one symbol that is employed for example in eight positions.

The invention further comprises an optical machine readable code having an arrangement of individual code symbols with a plurality of surfaces or bar-shaped segments, and an axis of symmetry. The symbols have a base configuration and multiple configurations rotated by a known amount from the base configuration. Further the invention comprises a code symbol for an optically readable code, the symbol having a plurality of surfaces or bar-shaped segments, and being laid out about an axis of symmetry.

BRIEF DESCRIPTION OF THE DRAWINGS

Exemplary embodiments of the invention are further described below with the aid of drawings in which.

DESCRIPTION OF THE PREFERRED EMBODIMENTS

Figure 1:
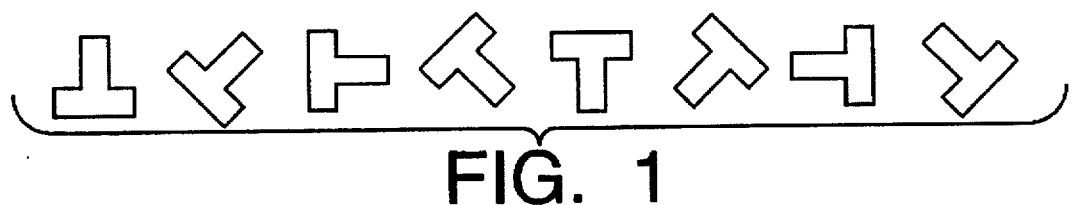
FIG. 1 is a first code symbol in its base position as well as seven further rotated positions.

FIG. 1 shows a first code symbol which is constructed in the form of a T standing on its head. The code symbol includes a plurality of surfaces, e.g., bar-shaped segments. The illustrated code-symbol is preferably applied to a recyclable container, in particular a recyclable PET bottle. The application of the code mark to plastic bottles, for example, by means of a laser is known. Moreover, a code is applied or an existing code is supplemented by a new code symbol for each bottle return passage through the filling operation whereby information is derived which can be again evaluated in the next bottle return cycle. Such information can, for example, be the number of refills of the bottle, the type of product with which the bottle has already been filled, the identity of the filling process and so forth. The individual code marks moreover will be engraved in the plastic material as already explained, preferably by means of a laser beam which passes over a mask having the corresponding code mark. The re-engraved code marks of this type can each be detected optically during the return cycle and by means of machine, a computer, be recognized in order to determine the information in the code. Since in one bottle filling process a very high bottle throughput should be achieved which corresponds to a very short read and recognition time, and since in a bottle filling operation difficult reading conditions prevail, in particular liquid on the bottles in the form of water droplets and film, it is not a simple process to read and recognize each code in an error free manner. The code symbol according to the present invention increases the readability and recognizability substantially. Since each code symbol is constructed symmetrically the possibility of false recognition as a result of the speed is substantially reduced. For example, the probability of a disturbance at a particular position is 0.1 and correspondingly the probability of a disturbance at a second position simultaneously is only 0.01. The symmetry of the code mark therefore provides the objective of improved readability and recognizability or the improved evaluation of the code under difficult conditions. Preferably, the code symbol is employed in a variety of rotational positions. In this manner with one code symbol large groups of information can be illustrated. In FIG. 1 this is shown for the inverted T symbol at the extreme left in its base position and which in the far right position is rotated 45°. In this manner it is possible with one code symbol, for example, to prescribe eight various types of products. Another symbol can then be employed for various filling materials or the fill product sequence can be coded on the bottle with one code in various rotated positions. The size of the code symbol on the bottle can fortunately be very small thanks to the exceptional recognizability. A preferred transverse dimension lies, for example, in the size range of approximately six millimeters.

Figure 2:
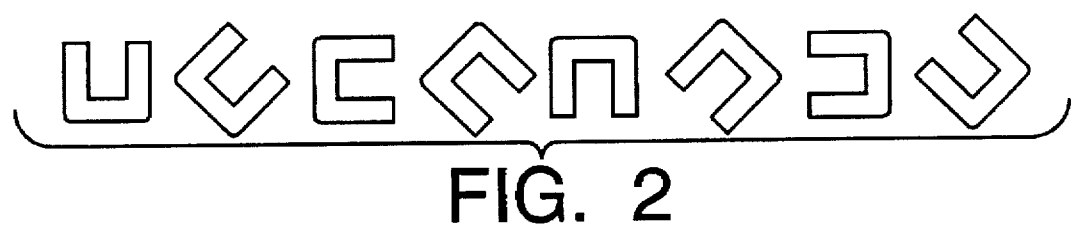
FIG. 2 is another code symbol in its base position as well as seven additional rotated positions.

FIG. 2 shows a further code symbol which includes several bar-shaped segments and in its base position is substantially U-shaped. Also with this symbol the axis of symmetry extends in the vertical direction in the base position illustrated in the drawing. Also, for the code symbol of FIG. 2 seven associated rotatable positions are illustrated which are each rotated by 45° relative to the base position. Naturally, instead of the illustrated rotation at 45° rotations at other angles can also be provided. Correspondingly, more or less variations of the code symbol from the base position are produced. One advantage of the rotation of the base symbol lies in that with the same basic mask shape employed for the code symbol in the base position, the other positions can also be produced.

Figure 3:
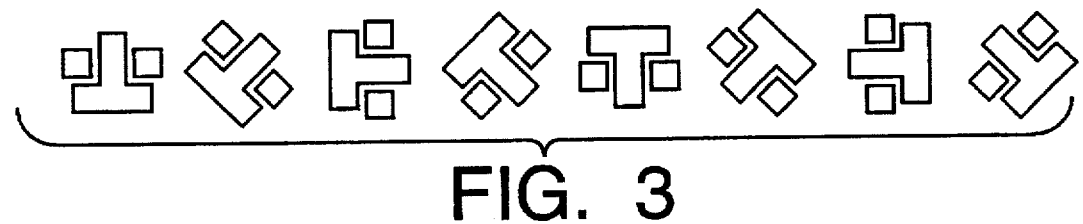
FIG. 3 is a further code symbol in its base and rotated positions.

FIG. 3 shows a further code symbol which likewise is comprised by an inverted T as well as two additional surfaces or bar-shaped segments. Here also the symmetric axis of the basic configuration illustrated in the drawing is vertical.

Figure 4:
FIG. 4 is a further code symbol in a base position.

FIG. 4 shows only the basic configuration of a further code symbol including bar-shaped segments and which is likewise T-shaped, but here the T-bar has a double width. The corresponding code symbols rotated from the base configuration are not further illustrated in the drawings, but can, without more, be produced by rotation in a manner corresponding to the other examples.

Figure 5:
FIG. 5 is a further code symbol in a base position.

FIG. 5 shows an essentially L-shaped code symbol in its basic configuration including bar-shaped segments. Here the axis of symmetry in the basic configuration does not extend in the vertical direction, but an angle of 45°. Also, for this code symbol the corresponding rotated symbol variations are not illustrated.

Figure 6:
FIG. 6 is likewise a code symbol in a base position.

FIG. 6 shows an essentially arrow-shaped code-symbol with bar-shaped segments, and in which the axis of symmetry in the basic configuration likewise extends at a 45° angle. Also with this code symbol the rotatably variable configurations can without more be produced, however, they are not illustrated in the drawing for simplicity.

I claim:

1. A method for marking refillable containers with machine readable code symbols upon each return for refilling, characterized by applying the code symbols to a container, each individual machine readable code symbol being comprised of a plurality of bar-shaped segments arranged symmetrically with respect to an axis of symmetry for the symbol.

2. A method according to claim 1 further characterized by the step of orienting each individual code symbol in an orientation including a base configuration and in a configuration rotated by a known amount about an axis of rotation relative to the base configuration.

3. A method according to claim 2 wherein the configuration in addition to the base configuration is one of seven configurations of the code symbol rotated by known amounts relative to the base configuration.

4. A method according to claim 1 wherein the step of applying the code symbols includes applying an essentially T-shaped code symbol, an essentially U-shaped code symbol, an essentially L-shaped code symbol, an essentially arrow-shaped code symbol, a T-shaped element having two segments arranged symmetrically relative to the axis of symmetry of the T, and a code symbol which corresponds to a T-shaped element with a widened transverse segment.

5. A method according to claim 1 characterized in that the code symbol is applied to the object by means of a laser.

6. A method according to claim 5 wherein each container to which the code symbols are applied is a plastic recyclable bottle.

* * * * *